United States Patent [19]

Teller

[11] Patent Number: 4,502,396
[45] Date of Patent: Mar. 5, 1985

[54] CONTROL OF DIOXIN EMISSIONS FROM INCINERATION

[75] Inventor: Aaron J. Teller, Palm Beach, Fla.

[73] Assignee: Teller Environmental Systems, Inc., Shrewsbury, Mass.

[21] Appl. No.: 488,131

[22] Filed: Apr. 25, 1983

[51] Int. Cl.³ .............................................. F23G 3/00
[52] U.S. Cl. ........................................ 110/346; 55/71; 55/84; 110/236; 110/237; 423/240
[58] Field of Search ................. 55/71, 97, 84, 89, 90, 55/93–95; 423/241, 240, 215.5; 549/359, 460; 110/346, 236, 237

[56] References Cited

U.S. PATENT DOCUMENTS

| | | | |
|---|---|---|---|
| 3,969,482 | 7/1976 | Teller | 55/71 |
| 4,019,444 | 4/1977 | Kleeberg et al. | 55/84 |
| 4,110,344 | 8/1978 | Stalling et al. | 549/359 |
| 4,246,255 | 1/1981 | Grantham | 423/240 |
| 4,293,524 | 10/1981 | Teller et al. | 55/260 |
| 4,319,890 | 3/1982 | Teller et al. | 55/1 |
| 4,402,274 | 9/1983 | Meenan | 110/237 |
| 4,416,855 | 11/1983 | Abrams et al. | 110/215 |

FOREIGN PATENT DOCUMENTS 1350727  4/1974  United Kingdom ............... 423/240

*Primary Examiner*—Bernard Nozick
*Attorney, Agent, or Firm*—Thompson, Birch, Gauthier & Samuels

[57] ABSTRACT

A combustion flue gas stream containing dioxins, some of which are in the vapor phase, is cooled to between 100° C. and 110° C. The dioxins in the vapor phase are converted to suspended particulates which are subsequently captured and then thermally destroyed.

8 Claims, 3 Drawing Figures

CONTROL OF DIOXIN EMISSIONS FROM INCINERATION

BACKGROUND OF THE INVENTION

The invention is directed to a method for reducing the levels of dioxins and other high molecular weight organic carcinogen emissions such as polychlorinated dibenzo furans generated by combustion processes into the atmosphere.

The presence of chlorinated dibenzo dioxins (PCDD) and chlorinated dibenzo furans (PCDF) has been reported in the emissions from municipal waste incinerators. They have been described as among the most acutely toxic substances known to man. Although the reported concentrations of these substances in incinerator emissions is low, the associated toxicity and carcinogenic implications are of substantial concern.

Earlier studies relating to PCDD and PCDF were directed to the identification and measurement of the PCDD and PCDF groups in the flyash collected by electrostatic precipitators (ESP). However, in the ASME Research Committee on Industrial and Municipal Wastes, Study on State of the Art of Dioxin from Combustion Sources (1980), the authors established that the dioxin collected with the flyash might be only a portion of the total dioxins emitted. They expressed the opinion that a considerable fraction of the PCDD might be associated with submicron particles and that notwithstanding all other factors, the focus on ESP flyash might not be sufficient for complete evaluation of PCDD emissions. An ESP is relatively more effective in removing large particles, i.e., those above submicron size. However, submicron particles are abundant in the flue gases emitted from the stacks of municipal waste incinerators. Moreover, submicron particulate show a much higher concentration of adsorbed organic pollutants than do larger diameter particulate materials.

The authors of the ASME study referred to preliminary data by Ballschmitter, who reported that the concentration of tetrachloro dibenzo dioxin (TCDD) in ESP flyash was significantly greater then the concentration of the TCDD in the flyash.

This type of phenomenon is similar to that referred to by Greenberg et al ES&T, 15(1), 64, (1981), who reported that more than 75% of the condensed compounds of Na, Cs, Cl, Br, Cu, Zn, As, Ag, Cd, Sn, Sb, W, and Pb were concentrated on particles with diameters less than 2 microns.

The authors of the ASME study further stated that variations in vapor phase concentration as a function of temperature may be responsible for part of the variation in PCDD group distributions from different facilities.

Data reported by Cavallaro A., et al., Chemosphere, II (No. 8), 859, (1982) for emissions from 6 incinerators in Italy and data reported by the Ministry of Environment of Ontario, Canada confirm the suspicions established in the ASME study. The dioxin concentration in flue gases are 10 to 1000 times greater than in the flyash and of that present in the flue gas, the concentration in the vapor phase can exceed that in the particulate phase.

The data reported by Cavallaro is condensed and appears in TABLE 1.

TABLE 1
DIOXIN EMISSIONS IN FLUE GAS (EXCLUSIVE OF FLYASH)

$$V/p = \frac{\text{Quantity in Vapor}}{\text{Quantity in Fine Particulate about } 220° \text{ C.}}$$

| Inc. No. | TCDD ng/Nm³ Vapor | Part. | Total | V/p | PCDD ng/Nm³ Vapor | Part. | Total | V/p |
|---|---|---|---|---|---|---|---|---|
| 1 | 19.6 | 1.6 | 20.7 | 17.8 | 449.2 | 24.3 | 474 | 18.5 |
| 2 | 17 | 172.2 | 189 | 0.1 | 28751 | 20247 | 48998 | 1.4 |
| 3 | 19 | 0.037 | 19.0 | 513 | 7501 | 8.9 | 7510 | 842 |
| 4 | 60 | 10.9 | 70.9 | 5.5 | 4353 | 56.4 | 4409 | 77.2 |
| 5 | 9.6 | 0.34 | 9.6 | 28.2 | 648.6 | 381.6 | 1030 | 1.7 |
| 6 | 19 | N.D. | 19 | — | 587 | 0.8 | 588 | 733 |

The flyash collected generally contained significantly less dioxins than that present on the airborne particulate. A parallelism existed for the ratio of dioxin content of vapor to airborne particulate for the TCDD and PCDD. In all cases but one, the emissions of TCDD in the vapor phase significantly exceeded that on the particulate.

This distribution of the PCDD in the flue gas was confirmed by the Ministry of Environment, Ontario in tests at the Hamilton incinerator with the emissions, 25–30 ug/m³ measured after the flue gas passed through a precipitator.

Guidelines for ground level concentrations of the PCDD's have been established by the ministry of Environment, Ontario and the New York State Department of Environmental Conservation.

The Ontario guideline is:

PCDD - 30 pg/Nm³      (ANNUAL AVERAGE)

PCDF - 1500 pg/Nm³

The New York guideline establishes a ground level of $9 \times 10^{-14}$ gm/Nm³ for total TCDD as an annual average, based on the upper range of ambient concentrations included in the EPA's 1981 reportwhich that evaluated health implications of TCDD's from five municipal incinerators.

The projected maximum stack emissions based on these guidelines at different levels of dilution by dispersion are set forth in Table II.

TABLE II
MAXIMUM PERMISSIBLE STACK EMISSIONS FUNCTION OF STACK DILUTIONS

| | Required Pg/Nm³ | Permissible Stack Concentration ng/Nm³ at Dilution Factor | | |
|---|---|---|---|---|
| Dilution Factor | | 1000 | 10000 | 50000 |
| Ontario PCDD | 30 | 30 | 300 | 1500 |
| N.Y.S. TCDD | 0.09 | 0.09 | 0.9 | 4.5 |

The dilution factors were based on the following (from a 100 m stack):
1000—fumigation maximum ground conc.
10000—dispersion—Brookhaven Model B₂, C, D.
50000—annual averaging The reductions in TCDD and PCDD emissions based on the average emissions reported by Cavallaro required to comply with the published guidelines are set forth in Table III.

TABLE III
PERCENT REDUCTION, CDD, REQUIRED TO COMPLY WITH GUIDELINES

| | Percent | |
|---|---|---|
| PCDD at Dilution | Ontario PCDD | New York TCDD |
| 1000 | 99.0 | 99.7 |
| 5000 | 94.6 | 98.4 |
| 10000 | 89.3 | 96.8 |

There two basic approaches to achieving the foregoing reductions are:
1—Thermal Destruction
2—Capture and Containment.

A 99.5% thermal destruction of dioxins has been reported to occur with exposure to a temperature of 1177° C. It was noted that a residence time of 2-3 seconds at 1200° C. provided effective destruction of PCB's in cement kilns. However, the reliable achievement of a combustion temperature of 1100-1200° C. in the incineration of municipal waste is questionable, principally because of the heterogeneity and variation in water content of the fuel.

It was reported that Gizzi et al., Chemposphere, II(6), 577, (1982), that the TCDD total emissions varied widely in 17 incinerator samples with an average of 70 ng/m$^3$ for 15 of the 17 and ~1700 ng/m$^3$ for 2 of the tests. The authors stated that for the two tests where high levels of dioxin were noted "on these days, the incinerator operating combustion temperature was the lowest, reaching about 500° C, probably because of the high moisture content of the waste." This change in water content is unavoidable in municipal waste incineration and results in inconsistency of thermal destruction. Auxiliary fuel firing responsive to temperature needs can be used to achieve destruction of the PCDD and PCDF compounds. However, control reliability and costs can be prohibitive.

Furthermore, an increase in operating temperature above the normal 1000° C. will result in an increase in NOx emissions, a counter productive measure, in view of NOx limitations, such as required in California. Although thermal destruction represents the most desirable mode of removal of the dioxin emission potential, there exists the necessity to prevent emission of residual dioxins present in the flue gas, because of the inherent lack of reliability of temperature control and the potential for increase in NOx formation.

The dioxins emitted from combustion processes are in the form of gas, submicron sublimates and are absorbed on other fine particulates. At the present time, conventional methods for the removal of dioxins are ineffective. Capture by electrostatic precipitators is inefficient because dioxins in the vapor form and the submicron form pass through the precipitators without collection. Higher efficiencies are achievable for particulate collection with a baghouse but the high concentration of fine particulates along with the dioxin results in excessive pressure drops and blinding of the bags. As mentioned above, maintaining high temperature when incinerating municipal waste is not feasable.

SUMMARY OF THE INVENTION

The present invention embodies a process for significantly reducing the levels of dioxins in a gaseous stream generated from a combustion process. The invention broadly comprises reducing the temperature of the flue gas stream containing dioxins to about 100° C. to 110° C. to reduce the vapor pressure of the dioxins by a factor of between about 50 to 100 compare with recovery from thermal emission systems. With this temperature-reducing step, from 98-99% of the dioxins originally present in the vapor phase appear either as suspended particulates or as deposits on other suspended particulates. These particulates are subsequently captured. Preferably, cooling is accomplished by water sprays, and in a particularally preferred embodiment, the gas is cooled in an upflow quench reactor, of the type described in U.S. Pat. No. 4,293,524. The suspended particulates originally in the 0.05-1.0 micron range are captured by target particulates in the 3-20 micron range to form grown particulates which then may be captured by conventional devices such as baghouses, or more referably by use of the process described in U.S. Pat. No. 4,319,890.

The present invention lies, to a considerable extent, in the determination of the hereto fore unknown vapor pressure data of the dioxins. I have discovered that the vapor component of the dioxins is temperature dependent and the particulate component represents the total quantity emitted minus the equilibrium quantity in the gas stream as a function of temperature. Based on this discovery, by cooling the flue gas stream, a conversion of 99% of the dioxins in the vapor phase to the condensed phase can be effected.

DESCRIPTION OF THE PREFERRED EMBODIMENT

The data for TCDD emissions reported by Cavallaro (220 C) are set forth in Table IV.

TABLE IV
TCDD EMISSIONS

| | Emissions ng/m$^3$ | |
|---|---|---|
| Incinerator | Particulate | Vapor |
| 1 | 1.1 | 19.6 |
| 2 | 172.2 | 17.0 |
| 3 | 0.037 | 19.0 |
| 4 | 10.9 | 60.0 |
| 5 | 0.34 | 9.6 |
| 6 | N.D. | 19.0 |

The wide variation in the TCDD particulate emission and the consistency within sampling and analytical accuracy for the vapor component, confirm that the vapor component represents the total quantity emitted minus the equilibrium quantity in the gas stream as a function of temperature. The mean value of 17-19 ng/m$^3$ in the vapor phase occurs over a particulate concentration range of N.D. to 172 ng/m$^3$. Thus, the implied vapor pressure of the TCDD is 19 ng/m$^3$ at 220° C.

The molecular weight of TCDD is 322. The vapor pressure equivalent to a concentration of 19 ng/Nm$^3$ is $1.3 \times 10^{-12}$ atm or $10^{-9}$ mm Hg at the flue gas temperature (220° C).

The effect of temperature on the vapor phase concentration was then evaluated.

It has been established, Clausisus-Clapeyron, that the variation of partial pressure with temperature is $$d\ln P = \frac{\Delta H}{RT^2} dT$$

However, experimental data for the heat of vaporization of TCDD are not available. In the prediction of the relationship of vapor pressure with temperature, the use of reference substance plots are applicable where molecular similarity exists and the vapor pressures are low. The reference substance relationship typical of the Cox-Othmer plot was used for estimation.

In the Cox-Othmer relationship, applicable primarily to the low vapor pressure range, the basis for a straight line relationship is that the ratio of the logs of the vapor pressure is proportional to the ratio of the logs of the heats of vaporization.

$$\frac{d\ln P_A}{d\ln P_B} = \frac{\Delta H_A}{\Delta H_B}$$

The linearity of the relationship is enhanced by similarities in the molecular characteristics of the compounds compared. Thus, comparison behavior was based on aromatic ring compounds, dibenzyl rings, chlorinated compounds, and that containing the ether bond, or a carbon-oxygen bond.

The compounds selected and their characteristics were

|  | MW | Arom Ring | C-C | C-O | C-O-C |
|---|---|---|---|---|---|
| TCDD | 322 | | | | |
| 2 chloro ethyl a methyl benzyl ether | 189.4 | | | | |
| Pentachlorophenol | 266.5 | | | | |
| PCB-Aroclor 1248 | 288 | | | | |
| PCB-Aroclor 1254 | 327 | | | | |

Figure 1:
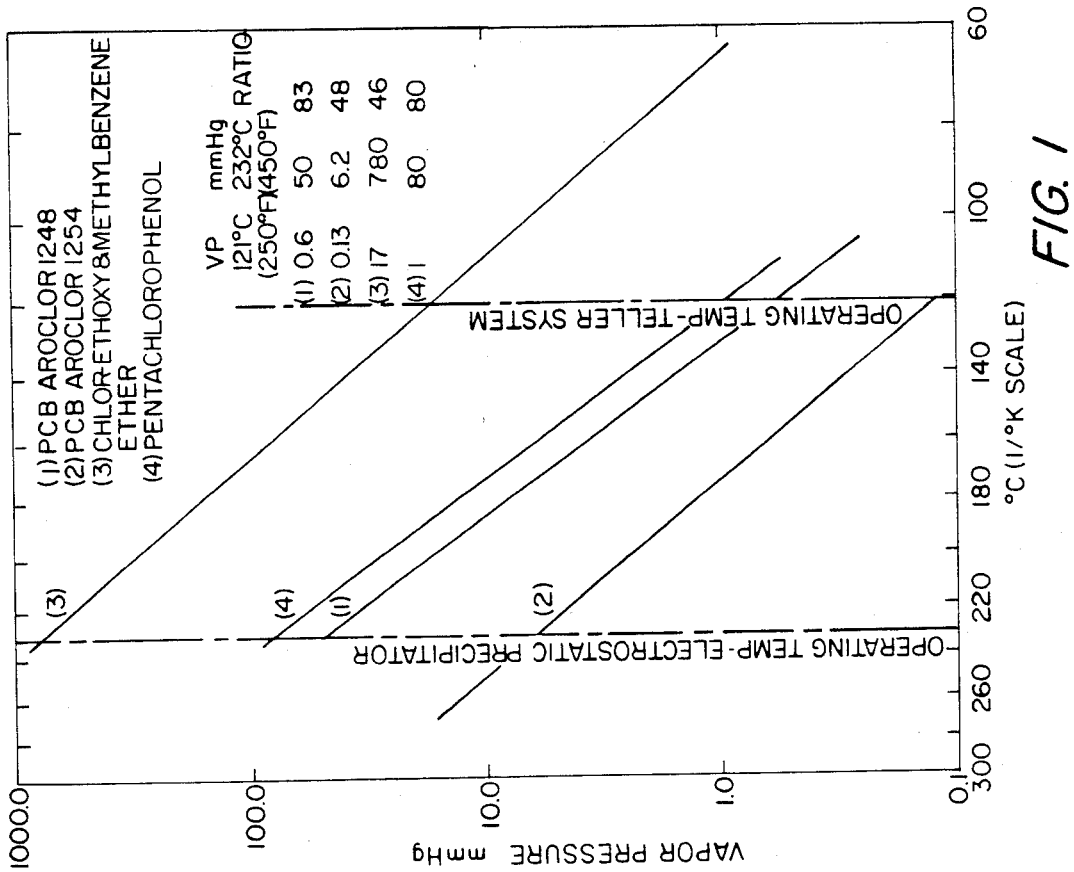
FIG. 1 is a Clausisus-Clapeyron chart of vapor pressures of reference compounds.
Figure 3:
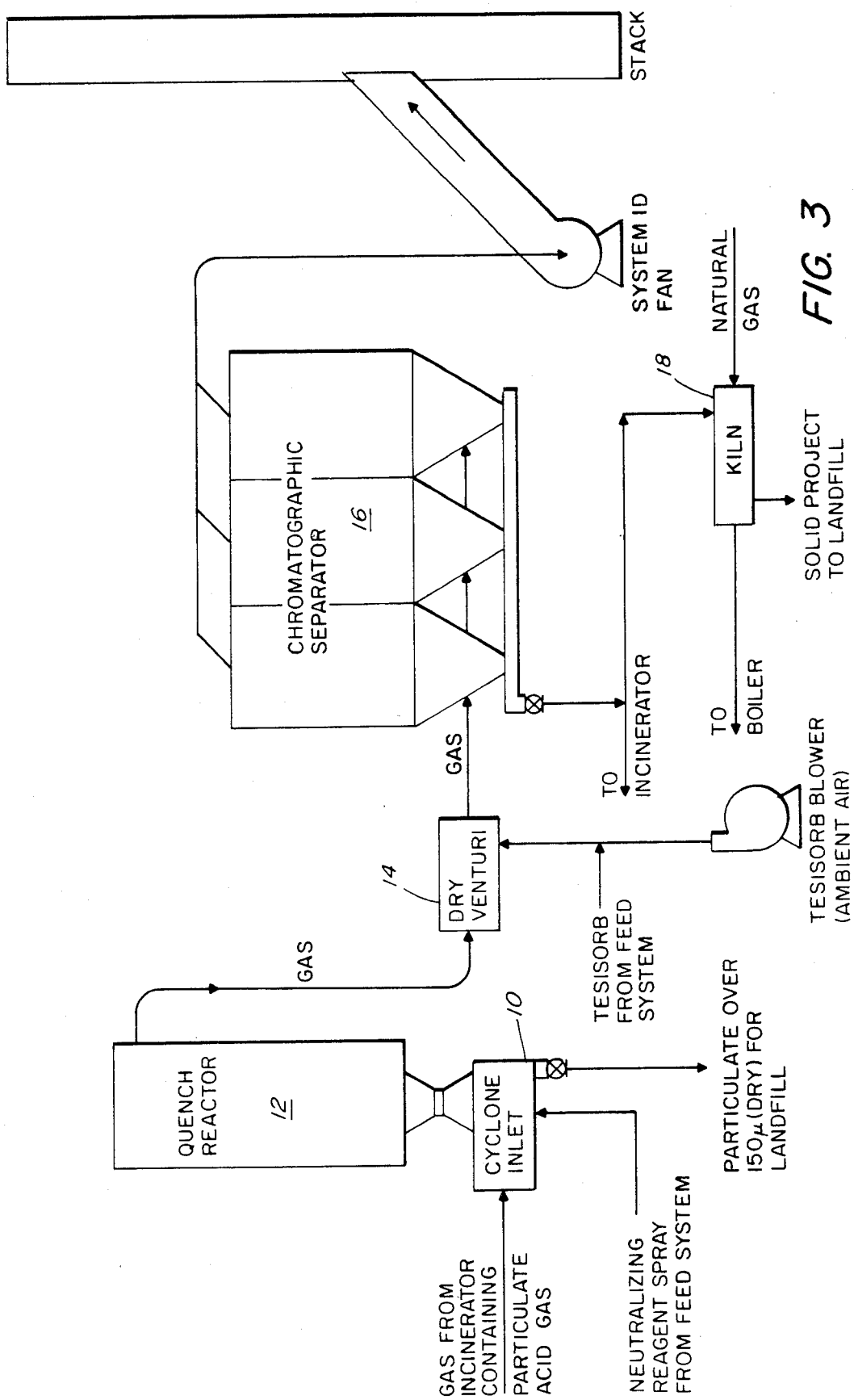
FIG. 3 is a process flow diagram of a system embodying the invention.

Referring to FIG. 1 the vapor pressures of the reference compounds were plotted on a Clausisus-Clapeyron chart. Uniquely the slopes of the lines, equal to H/R, were quite similar indicating that the vaporizaton behavior was similar.

Figure 2:
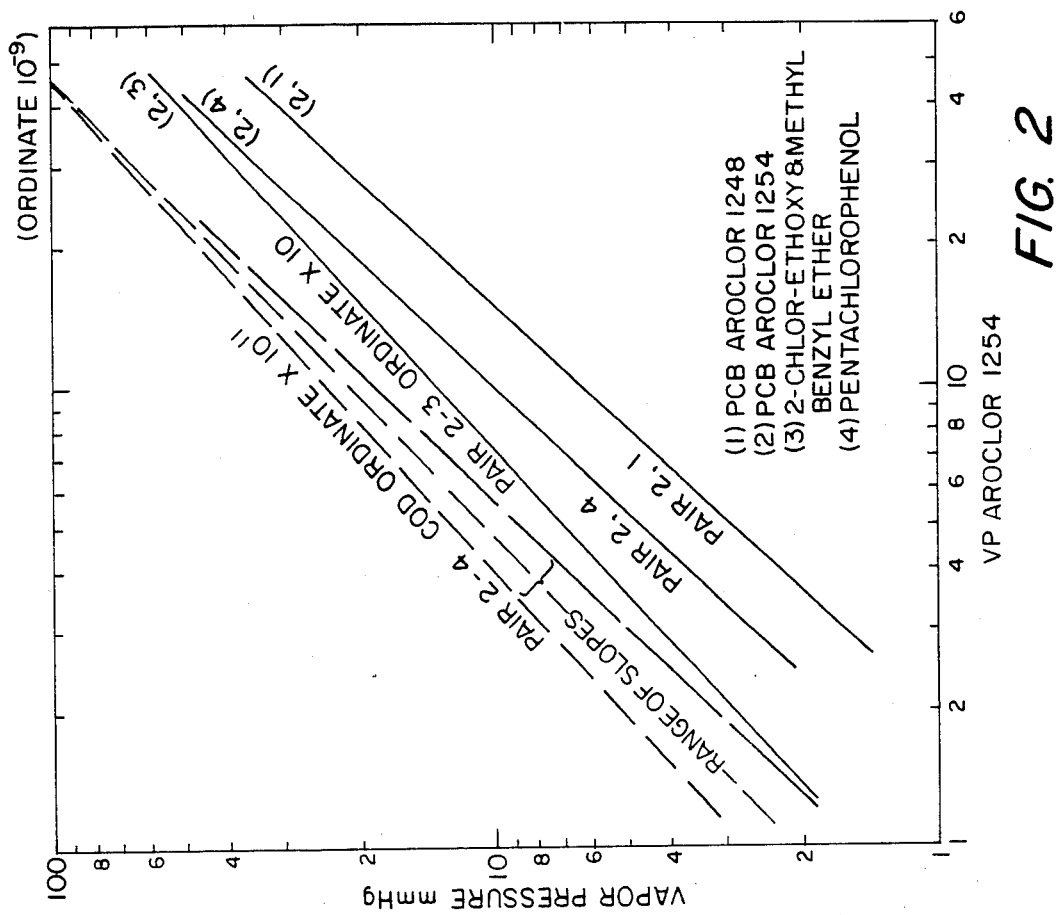
FIG. 2 is a Cox-Othmer plot for a range of slopes for analogue compounds.

As shown in FIG. 2, PCB-Aroclor 1254 (No. 2) was selected as the reference compound and the Cox-Othmerr plot was developed for the other three compounds. Straight lines were obtained. Utilizing the vapor pressure of TCDD at 220° C, the Cox-Othmer plot was established for the range of slopes determined for the three analogue compounds.

The vapor phase concentrations of TCDD as a function of temperature and the percent decrease in the TCDD concentration in the vapor phase as a function of operation below 220° C. are indicated in TABLE V.

TABLE V

EFFECT OF TEMPERATURE ON VAPOR PHASE CONCENTRATION OF TCDD
(from FIG. 2 Cox-Othmer Plot)

|  | Temp. C | Conc. ng/Nm$^3$ | % Reduction Compared to 220 C |
|---|---|---|---|
| ESP | 220 (6) | 19 | 0 |
| Case 1 | 120 | 0.4–0.6 | 97–98 |
| Case 2 | 110 | 0.2–0.4 | 98–99 |

TABLE V-continued

EFFECT OF TEMPERATURE ON VAPOR PHASE CONCENTRATION OF TCDD
(from FIG. 2 Cox-Othmer Plot)

|  | Temp. C | Conc. ng/Nm$^3$ | % Reduction Compared to 220 C |
|---|---|---|---|
| Case 3 | 100 | 0.1–02 | 99–99.5 |

Thus, for effective reduction of the vapor phase PCDD, the emission control system operating temperature should be reduced to 100°–110° C.

It should be noted that evenif the PCDD emissions were reduced by improved incineration, as long as the emissions exceeded 19 ng/Nm$^3$ of flue gas, a vapor concentration of 19 ng/Nm$^3$ would exist at 220° C. Thus, improvement of the efficiency of particulate collection at this temperature would not reduce this emission.

The requirement for reduction in temperature imposes an additional requirement on the emission control system to ~100° C., a conversion of approximately 99% of the PCDD from vapor to the condensed phase will occur. Inasmuch as condensation will tend to occur on the fine particulate nuclei, it is essential that these particulates be removed from the flue gas. The collection system must be capable of removal to the statistical 0.3 micron range.

The particulate emissions from grate type incinerators are of the order of 10–30 pounds per ton of MSW. The particulate, less than 2 in diameter, represents about 20% of that emission. Thus for incinerators operating with 60–100% excess air, the fine particulate emission is of the order of 0.1–0.3 GR/DSCF.

Inasmuch as the fine particulate emission is caused, to a major degree by thermal formation, the concentration is normally independent of the total particulate emitted and therefore independent of the type of combustor or preparation of the solid waste.

With the conversion of vapor phase dioxins to the condensed phase on the fine particulate, a 96–99% recovery of this group of particulates is required in order to meet the existing guidelines, at a stack dilution factor of 5000 for New York State and 95% for Ontario.

The application of this requirement to permissible particulate emission levels is set forth in Table VI.

TABLE VI

RELATIONSHIP OF PARTICULATE EMISSION LEVEL AND DEGREE OF REMOVAL OF FINE PARTICULATES

|  | mg/NCM | GR/DSCF |
|---|---|---|
| Uncontrolled fine particulates | 458 | 0.2 |
| 60% reduction | 183 | 0.08-present EPA |
| 80% reduction | 92 | 0.04-Average State requirement |
| 95% reduction | 23 | 0.01-California |
| 97% reduction | 15 | 0.006 |

It is implied, therefore, that particulate emissions from incineration should be reduced below 0.006 GR/DSCF after system temperature reduction to 100°–110° C. in order to reduce dioxin emissions to that required by the most demanding guideline.

Based on data obtained from commercial operations for control of fine emissions from combustion processes, this is attainable, economically.

The following data were obtained from operations where the gas is subjected to the following two stage particulate treatment:

1. collection of the fine particulate on host targets in a dry venturi operating at 0.5–1 in. w.g. pressure drop U.S.P. No. 4,319,890; and 2. final collection of the "grown" particulate in a baghouse.

The outlet particulate were those listed Table VII.

TABLE VII

PARTICULATE EMISSIONS
TELLER DRY SYSTEMS

| Application | Condensibles | Fine Particulate | Cloth | Outlet Part. GR/DSCF | Pressure Drop in. w.g. | Shake Cycle Hrs. |
|---|---|---|---|---|---|---|
| Fiberglass | Boric Acid | Sodium sulfate<br>Sodium silicofluoride | Dacron | 0.001–0.003 | 3 | 20 |
| Secondary Aluminum | Hydrocarbons<br>Metal Salts | Carbon (oily)<br>Sodium Fluoride<br>Sodium chloride | Dacron | 0.001–0.004 | 5 | 8 |
| FGD | | Carbon | Glass | 0.004–0.006 | 5 | 8 |
| Incineration MSW | Heavy Metal Salts<br>Hydrocarbons | Carbon<br>Inorganics | Glass | 0.005<br>(88% design rate) | 4 | 12 |
| | | | Glass | 0.009<br>(148% of design flow) | 5 | 12 |

The reduction in particulate emissions from incineration of MSW was achieved at low pressure drop in the baghouse, about 4 in. w.g. as a result of the prior capture of the fine particulates by the dry venturi operating at a $\frac{1}{2}$ in. w.g. pressure drop. The precapture results in a baghouse shake cycle of the order of 12 hours, permitting improved filtration and performance as a backup acid gas reactor.

The following is an example of the preferred method of the invention. Referring to FIG. 3 a gaseous stream is introduced into the inlet 10 of an upflow quench reactor 12 such as described in U.S. Pat. No. 4,293,524 which patent in its entirety is incorporated by reference in this disclosure. The stream enters at a temperature of between about 200° to 260° C. say for example 230° C. The composition of the stream containing dioxin will vary as exemplified in the above-referenced reports. The gaseous stream is neutralized by a solution or slurry and the temperature is reduced to about 125° C. The larger particle sizes over 150 microns are removed from the reactor and the gaseous stream leaves the reactor 12 and is introduced into a dry venturi 14 of the type disclosed in U.S. Pat. No. 4,319,890, which patent in its entirety also is incorporated by reference in this disclosure.

In the dry venturi 14, the fine particles are captured by imposed targets continuously fed to the system where the temperature is reduced to 100°–110° C. The "grown" particles then proceed to the baghouse 16 or alternate capture device. Because the particle size distribution is shifted to the larger sizes, the baghouse pressure drop is low and permits thick cake to build up. Typical pressure drops are 4 in. w.g. with a twelve hour shake cycle. The thick cake permits more effective filtration and provides for an accumulation of unreacted reagent, continuing the neutralization process. The solid product from the baghouse can be discharged to landfill.

If total destruction of the dioxins is desired, a portion of the product can be returned to the incinerator (not shown) where the excess reagent is partially utilized to inhibit HC generation and secondary HC reactions and the other portion of the cake can be directed to a kiln 18. The cake is heated to 2000 ° F. in a gas fired or alternate fuel arrangement. The exhaust gases are directed to the thermal recovery system. The solid product, now stripped of volatiles including dioxins is discharged to landfill.

The example described a particular cooling step (quench reactor neutralization) and a particular submicronparticulate capture step (dry venturi). Other methods may be employed for these steps and are within the scope of the invention. Whether the cooling step is accomplished by water sprays or some other means will depend upon the composition of the gaseous stream, flow rate, temperature etc. Similarly these factors will determine the most appropriate way of submicron particulate capture and grown particulate capture.

Having described my invention what I now claim is:

1. A method of reducing the level of vaporous PCDDs and PCDFs in a gaseous stream generated from a combustion process which stream contains entrained particulate solids and the vaporous PCDDs and PCDFs which method includes:

lowering the temperature of the gaseous stream to between about 100°–110° C. to cause a major proportion of the PCDDs and PCDFs originally present in the vapor phase to be condensed on the particulate solids; and removing the particulate solids containing the condensed PCDDs and PCDFs from the gaseous stream.

2. The method of claim 1 wherein the temperature of the combustion process is about 1000° C.

3. The method of claim 1 which includes prior contacting of the gaseous stream with an aqueous spray to lower said temperature.

4. The method of claim 1 wherein the gaseous stream contains particles and acidic components and includes prior flowing the gaseous stream through a chamber in an upwardly moving direction to effect separation of the larger moving particles from the gaseous stream;

transferring the gaseous stream from the first chamber into a second chamber;

introducing a spray of basic liquid material in a direction concurrent with the upwardly moving stream to evaporate substantially all of the basic material while reducing the temperature of the gaseous stream to about 125° C. and to form a dry stream with entrained acid salts and the suspended particulates.

5. The method of claim 1 wherein the gaseous stream is a primary gas stream and which includes capturing the particulates by contacting the primary gas stream with a secondary gas stream said secondary stream downstream or said spray having target particules dispersed therein said target particles having an average particle size between 3-50 microns, the target particles impacting with the suspended particules to form growth particulates.

6. The method of claim 1 which includes incinerating the growth particulates containing PCDDs and PCDFs.

7. The method of claim 1 wherein said particulate solids are at least 0.05 microns.

8. The method of either claims 1 or 7 wherein prior to being removed, said particulate solids are captured by target particulates in the 3-20 micron range to form grown particulates.

* * * * *